(12) United States Patent
Smithson

(10) Patent No.: US 8,821,087 B2
(45) Date of Patent: Sep. 2, 2014

(54) ATTACHMENT METHOD

(75) Inventor: Martin Robert Smithson, Cheshire (GB)

(73) Assignee: Scotts Hire Limited, Manchester (GB)

( * ) Notice: Subject to any disclaimer, the term of this patent is extended or adjusted under 35 U.S.C. 154(b) by 0 days.

(21) Appl. No.: 13/990,536

(22) PCT Filed: Nov. 30, 2011

(86) PCT No.: PCT/GB2011/052368
§ 371 (c)(1),
(2), (4) Date: Aug. 22, 2013

(87) PCT Pub. No.: WO2012/073026
PCT Pub. Date: Jun. 7, 2012

(65) Prior Publication Data
US 2013/0323006 A1    Dec. 5, 2013

(30) Foreign Application Priority Data

Nov. 30, 2010  (GB) .................................. 1020208.3
Mar. 8, 2011   (GB) .................................. 1103924.5

(51) Int. Cl.
*B60P 3/06*   (2006.01)
*B60P 3/073*  (2006.01)
*B60P 3/077*  (2006.01)

(52) U.S. Cl.
CPC ............ *B60P 3/077* (2013.01); *B60P 3/073* (2013.01); *B60P 3/062* (2013.01)
USPC .......................................................... 410/7

(58) Field of Classification Search
USPC .......... 410/3, 4, 7, 9; 414/469, 467, 539, 540
See application file for complete search history.

(56) References Cited

U.S. PATENT DOCUMENTS

| 1,776,935 | A | * | 9/1930 | Snyder ............................ 410/30 |
| 2,318,802 | A |   | 5/1943 | Reid |
| 2,812,081 | A |   | 11/1957 | Schrader |
| 3,147,871 | A | * | 9/1964 | Rogers ......................... 414/469 |
| 3,909,053 | A |   | 9/1975 | Koch |
| 4,955,459 | A |   | 9/1990 | Murphy |

(Continued)

FOREIGN PATENT DOCUMENTS

| AU | 2009101330 A4 | 1/2010 |
| DE | 202004010777 U1 | 9/2004 |

(Continued)

OTHER PUBLICATIONS

Patent Cooperation Treaty, International Search Report for PCT/GB2011/052368 dated Feb. 17, 2012, 5 pages.

(Continued)

*Primary Examiner* — H Gutman
(74) *Attorney, Agent, or Firm* — Stephen F. Swinton, Jr.; Hoffman Warnick LLC

(57) ABSTRACT

An attachment method for attaching a piece of plant machinery such as a mini-excavator to mount, for example a mount on a transporter or trailer. The piece of plant machinery is moved to a mounting location and a moveable portion arrangeable relative to the body is arranged in cooperative engagement with the mount to attach the piece of plant machinery thereto. The moveable portion may for example comprise a moveable drive 10 portion, a scraping blade or an arm.

12 Claims, 9 Drawing Sheets

(56) References Cited

U.S. PATENT DOCUMENTS

| | | | |
|---|---|---|---|
| 5,215,425 A | 6/1993 | Hambright | |
| 5,387,070 A | 2/1995 | Roeling | |
| 5,394,583 A | 3/1995 | Plate | |
| 6,019,566 A | 2/2000 | Thier et al. | |
| 6,099,218 A * | 8/2000 | Ferrari | 410/7 |
| 6,139,231 A | 10/2000 | Kissel | |
| 7,669,874 B2 | 3/2010 | Seifried et al. | |
| 2003/0173752 A1 | 9/2003 | Veeser | |
| 2004/0120784 A1 | 6/2004 | Sargent | |
| 2004/0181977 A1 | 9/2004 | Yamamoto et al. | |

FOREIGN PATENT DOCUMENTS

| | | |
|---|---|---|
| DE | 202007008759 U1 | 1/2008 |
| FR | 2676691 A1 | 11/1992 |
| GB | 2287762 A | 9/1995 |
| GB | 2430917 A | 4/2007 |
| GB | 2430918 B | 12/2007 |
| GB | 2455636 A | 6/2009 |
| JP | H09315206 A | 12/1997 |
| WO | 9515421 A1 | 6/1995 |
| WO | 03072423 A1 | 9/2003 |
| WO | 2007129054 A1 | 11/2007 |

OTHER PUBLICATIONS

GB Intellectual Property Office, Search Report under Section 17 for UK Patent Application GB2486030 dated Jun. 28, 2011, 1 page.

GB Intellectual Property Office, Search Report under Section 17 for UK Patent Application GB2486031 dated Jun. 28, 2011, 2 pages.

GB Intellectual Property Office, Examination Report Under Section 18(3) for GB Application No. GB1103922.9 dated Nov. 19, 2013, 2 pages.

* cited by examiner

ATTACHMENT METHOD

FIELD OF THE INVENTION

The present invention relates to attachment method, in particular to attachment methods suitable for attaching a piece of plant machinery to a mount. The present invention further relates to mounts suitable for attaching a piece of plant machinery thereto. The present invention still further relates to associated kits and transporters.

BACKGROUND TO THE INVENTION

Pieces of transportable plant machinery, for example diggers and the like must be securely mounted to a transporter during transportation. However, arranging machinery on a transporter and then securing it using straps and tie-bars brings a number of problems—problems in safely carrying the straps or tie bars, and problems in ensuring their correct use.

It is an aim example embodiments of the present invention to address at least one problem associated with the prior art, whether identified herein, or otherwise.

SUMMARY OF THE INVENTION

In a first aspect, the present invention provides an attachment method for attaching a piece of plant machinery to mount, the piece of plant machinery comprising a body and a moveable portion arrangeable relative to the body, the attachment method comprising moving the body relative to the mount to bring the piece of plant machinery to a mounting location, and arranging the moveable portion in cooperative engagement with the mount to attach the piece of plant machinery thereto.

Suitably, the attachment method comprises a method of attaching a piece of plant machinery to the mount. Suitably, the attachment method comprises a method of attaching a piece of plant machinery to a transporter, preferably a trailer. Suitably, the attachment method comprises a method of attaching a piece of plant machinery in the form of a digger, preferably a mini-excavator.

Suitably, the attachment method comprises moving the body relative to the mount by driving the piece of plant machinery, preferably driving the piece of plant machinery under its own power. Suitably, the arranging the moveable portion in cooperative engagement with the mount to attach the piece of plant machinery thereto comprises operating the piece of plant machinery to move the moveable portion under its own power. Suitably, moving the body relative to the mount takes place in a different direction to a direction of movement involved in arranging the moveable portion in cooperative engagement with the mount. Suitably, the step of moving the body is commenced before the step of arranging the moveable portion. Suitably, the step of moving the body is completed before the step of arranging the moveable portion. Suitably, the mount comprises a static component. Suitably, the mount comprises no moving parts.

Suitably, the mount comprises a cowling to receive the moveable portion. Suitably, the cowling is arranged above a surface on which the body of the piece of plant machinery rests. Suitably, the arranging the moveable portion in cooperative engagement with the mount comprises moving the moveable portion into a position in which at least a part of the moveable portion is under the cowling. Suitably, the piece of plant machinery comprises a drive portion in contact with the surface on which the piece of plant machinery rests and by which the piece of plant machinery may be moved, and the mount comprises a cowling to receive at least a part of the drive portion of the piece of plant machinery. Suitably, the drive portion comprises an arrangement of wheels or tracks.

Suitably, the cowling comprises a first portion, and the arranging the moveable portion in cooperative engagement with the mount comprises arranging a front part of the drive portion alongside the first portion of the cowling. Suitably, the cowling comprises second portion, and the arranging the moveable portion in cooperative engagement with the mount comprises arranging a rear part of the drive portion alongside the second portion. Suitably, the cowling comprises a third portion, and the arranging the moveable portion in cooperative engagement with the mount comprises arranging an upper part of the drive portion alongside the third portion. In other embodiments the cowling comprises only the first and third portions, or only the third portion, or only the first portion, or only the first and second portions, or only the second and third portions. Suitably, the cowling comprises at least one portion that is arrangeable to move to a loading position in which movement of the body relative to the mount to bring the piece of plant machinery to a mounting location is uninhibited, and arrangeable to move to a loaded position to cooperate with the piece of plant machinery to contribute to attaching the piece of plant machinery to the mount. Suitably, the second portion of the cowling is moveable into loading and loaded positions. Suitably, the third portion of the cowling is a moveable into loading and loaded positions.

Suitably, the mount comprises two cowlings, preferably opposed to one another, each to receive a moveable portion. Suitably, the mount comprises a first cowling arranged to receive a drive portion on a first side of the piece of plant machinery. Suitably, the mount comprises a second cowling arranged to receive a drive portion on a second side of the piece of plant machinery. Suitably, the piece of plant machinery comprises drive portions on opposed first and second sides thereof. Suitably, the piece of plant machinery comprises a moveable portion in the form of first and preferably second drive portions that are moveable, preferably expandable into the mount to move into cooperative engagement with the mount to attach the piece of plant machinery thereto. Suitably, the piece of plant machinery comprises first and second drive portions that are expandable away from one another and into cooperative engagement with the mount. Suitably, the piece of plant machinery comprises first and second drive portions that are expandable away from one another in a direction other than, preferably perpendicular to, the direction of moving the body relative to the mount to bring the piece of plant machinery to a mounting location.

Suitably, the moveable portion comprises a moveable drive portion of the piece of plant machinery in contact with the surface on which the piece of plant machinery rests and by which the piece of plant machinery may be moved. Suitably, moving the body relative to the mount to bring the piece of plant machinery to a mounting location comprises moving the body such that the moveable drive portion lies alongside the mount. Suitably the arranging the moveable portion comprises expanding the drive portion into cooperative engagement with the mount.

Suitably, the method comprises driving a drive portion against a drive portion guide means. Suitably, the method comprises driving a drive portion against into an introducing portion of the guide means, the introducing portion presenting a wider opening to the drive portion to facilitate alignment of the drive portions and then subsequently driving the drive portion toward spreading guide rails of the guide means to bring the drive portions into place relative to the mount.

Suitably, the moveable portion comprises a scraping blade of the piece of plant machinery, and the arranging the moveable portion comprises lowering the scraping blade into cooperative engagement with the mount. Suitably, the mount comprises a stop against which the lowered scraping blade can rest. Suitably, the stop extends from a surface on which the piece of plant machinery rests. Suitably, moving the body relative to the mount to bring the piece of plant machinery to a mounting location comprises moving the body such that the scraping blade passes over the mount. Suitably, the moving the body relative to the mount takes place in a first direction, and the stop is arranged when in cooperative engagement with the scraping blade to resist movement of the scraping blade in a second direction. Suitably, the second direction is parallel to, but opposite in sense to the first direction. Suitably, the stop extends in a direction parallel to a scraping edge of the scraping blade. Suitably, the stop is arranged when in cooperative engagement with the scraping blade to resist movement of the scraping blade in first and second directions.

Suitably, the moveable portion comprises an arm of the piece of plant machinery. Suitably, the moveable portion comprises a tool coupling arranged toward the end of the arm, and arranging the moveable portion comprises positioning the tool coupling to be coupled to the mount.

In a second aspect, the present invention provides a mount for attaching a piece of plant machinery thereto, the piece of plant machinery comprising a body and a moveable portion arrangeable relative to the body, the mount arranged such that with the body of the piece of plant machinery moved to a mounting location, movement of the moveable portion brings the moveable portion into cooperative engagement with the mount to attach the piece of plant machinery thereto.

Suitably, the mount is arranged such that moving the body relative to the mount takes place in a different direction to a direction of movement involved in arranging the moveable portion in cooperative engagement with the mount. Suitably, the mount comprises a static component. Suitably, the mount comprises no moving parts.

Suitably, the mount comprises a cowling to receive the moveable portion. Suitably, the cowling is arranged above a surface on which the body of the piece of plant machinery rests. Suitably, the cowling is arranged to receive at least a part of the moveable portion there-under when the moveable portion is arranged in cooperative engagement with the mount. Suitably, the cowling is arranged to receive at least a part of a drive portion of the piece of moveable plant machinery when the moveable portion is arranged in cooperative engagement with the mount. Suitably, the drive portion comprises an arrangement of wheels or tracks of the piece of plant machinery.

Suitably, the cowling comprises a first portion, and the arranging the moveable portion in cooperative engagement with the mount comprises arranging a front part of the drive portion alongside the first portion of the cowling. Suitably, the cowling comprises second portion, and the arranging the moveable portion in cooperative engagement with the mount comprises arranging a rear part of the drive portion alongside the second portion. Suitably, the cowling comprises a third portion, and the arranging the moveable portion in cooperative engagement with the mount comprises arranging an upper part of the drive portion alongside the third portion. In other embodiments the cowling comprises only the first and third portions, or only the third portion, or only the first portion, or only the first and second portions, or only the second and third portions. Suitably, the cowling comprises at least one portion that is arrangeable to move to a loading position in which movement of the body relative to the mount to bring the piece of plant machinery to a mounting location is uninhibited, and arrangeable to move to a loaded position to cooperate with the piece of plant machinery to contribute to attaching the piece of plant machinery to the mount. Suitably, the second portion of the cowling is moveable into loading and loaded positions. Suitably, the third portion of the cowling is a moveable into loading and loaded positions. Suitably, the method comprises arranging a moveable portion of the cowling into a loading position prior to moving the body of the piece of plant machinery to the mounting position. Suitably, the method comprises arraign the moveable portion of the cowling into a loaded position subsequent to moving the body of the piece of plant machinery to the mounting position.

Suitably, the mount comprises two cowlings, preferably opposed to one another, each to receive a moveable portion. Suitably, the mount comprises a first cowling arranged to receive a drive portion on a first side of the piece of plant machinery. Suitably, the mount comprises a second cowling arranged to receive a drive portion on a second side of the piece of plant machinery. Suitably, the piece of plant machinery comprises a moveable portion in the form of first and preferably second drive portions that are moveable, preferably expandable into the mount to move into cooperative engagement with the mount to attach the piece of plant machinery thereto. Suitably, the piece of plant machinery comprises first and second drive portions that are expandable away from one another and into cooperative engagement with the mount. Suitably, the piece of plant machinery comprises first and second drive portions that are expandable away from one another in a direction other than, preferably perpendicular to, the direction of moving the body relative to the mount to bring the piece of plant machinery to a mounting location.

Suitably, the mount comprises a guide means, preferably a guide rail, to bring the drive portion into alignment with, preferably parallel alignment with the mount. Suitably, the mount comprises an introducing portion of a guide means, the introducing portion presenting a wider opening to the drive portion to facilitate alignment of the drive portions. Suitably, the method comprises driving the drive portion toward spreading guide rails to bring the drive portions into place relative to the mount.

Suitably, the moveable portion comprises a scraping blade of the piece of plant machinery, and the mount is arranged such that lowering the scraping blade brings the scraping blade into cooperative engagement with the mount. Suitably, the mount comprises a stop against which the lowered scraping blade can rest. Suitably, the stop extends from a surface on which the piece of plant machinery rests. Suitably, the mount is arranged such that moving the body relative to the mount to bring the piece of plant machinery to a mounting location comprises moves the scraping blade over the mount. Suitably, the mount is arranged such that moving the body relative to the mount takes place in a first direction, and the stop is arranged when in cooperative engagement with the scraping blade to movement of the scraping blade in a second direction is resisted. Suitably, the second direction is parallel to, but opposite in sense to the first direction. Suitably, the stop extends in a direction parallel to a scraping edge of the scraping blade. Suitably, the stop is arranged when in cooperative engagement with the scraping blade to resist movement of the scraping blade in first and second directions.

Suitably, the mount is compatible with a tool coupling provided on a moveable portion in the form of an arm of the piece of plant machinery. Suitably, the mount is compatible with a quick-release tool coupling provided for mounting a tool on the end of the arm. Suitably, the mount is compatible with a bucket or breaker coupling provided for mounting a bucket or beaker on the arm.

Suitably, the mount is coupled to a trailer. Suitably, the trailer comprises a plurality of said mounts. Suitably, the mount is a mini-excavator mount.

In a third aspect, the present invention comprises a kit comprising a mount as described in relation to the second aspect of the invention above in combination with a piece of plant machinery. Suitably, the piece of plant machinery comprises a mini-excavator.

In a fourth aspect, the present invention provides a transporter comprising a mount as described in relation to the second aspect of the invention above, or which is useful in performing the method of the first aspect of the invention above. Suitably, the transporter is a trailer.

In a fifth aspect, the present invention provides in combination a transporter and a piece of plant equipment, attached according to the method of the first aspect of the invention as above, or attached using the mount of the second aspect of the present invention as above, or attached to form the kit of the third aspect of the invention as above. Suitably, the transporter is a trailer.

According to the present invention there is provided an apparatus and method as set forth in the appended claims. Other features of the invention will be apparent from the dependent claims, and the description which follows.

BRIEF INTRODUCTION TO THE DRAWINGS

For a better understanding of the invention, and to show how embodiments of the same may be carried into effect, reference will now be made, by way of example, to the accompanying diagrammatic drawings in which.

DESCRIPTION OF EXAMPLE EMBODIMENTS

Figure 1:
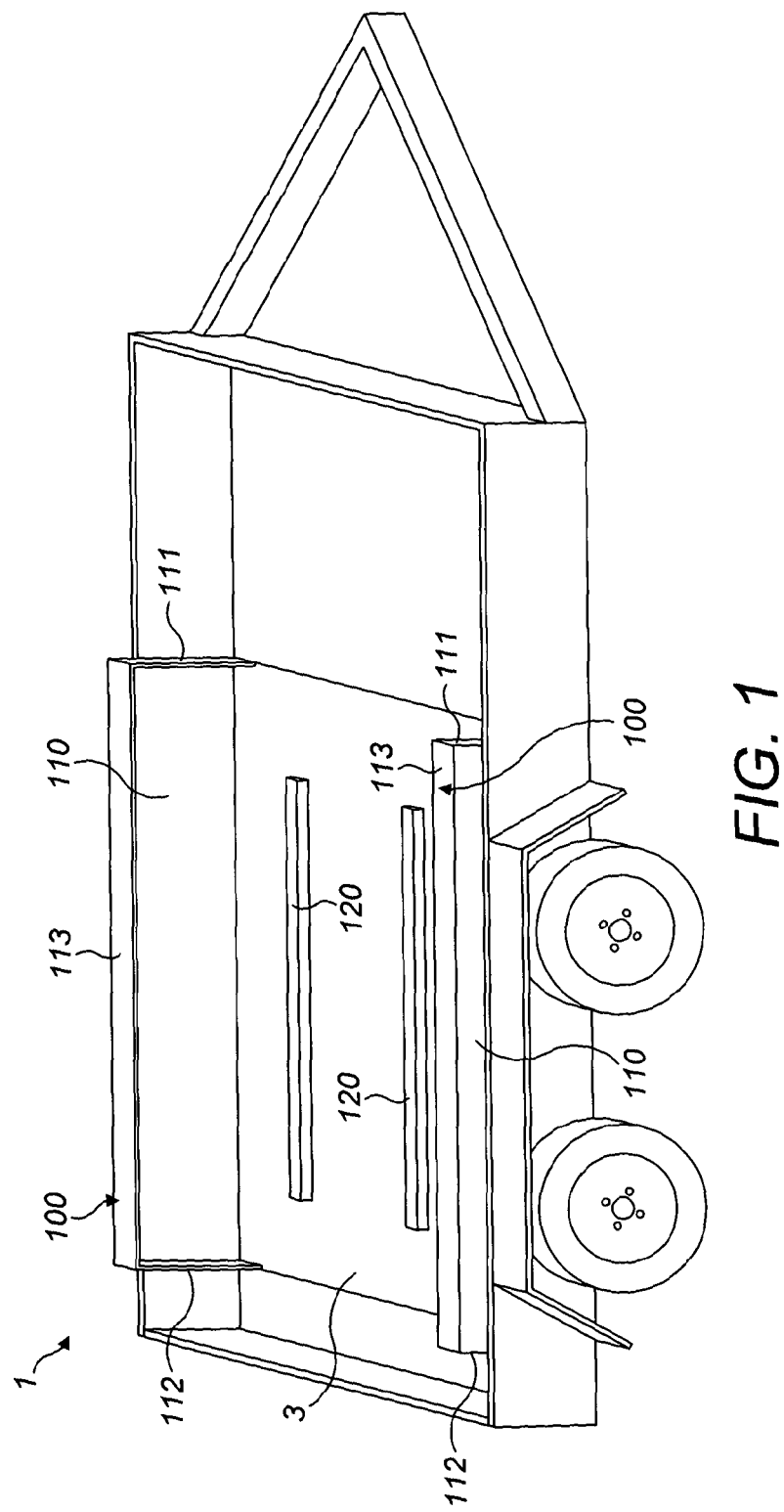
FIG. 1 shows a schematic side perspective view of a trailer including a mount according to an example embodiment of the present invention.
Figure 2:
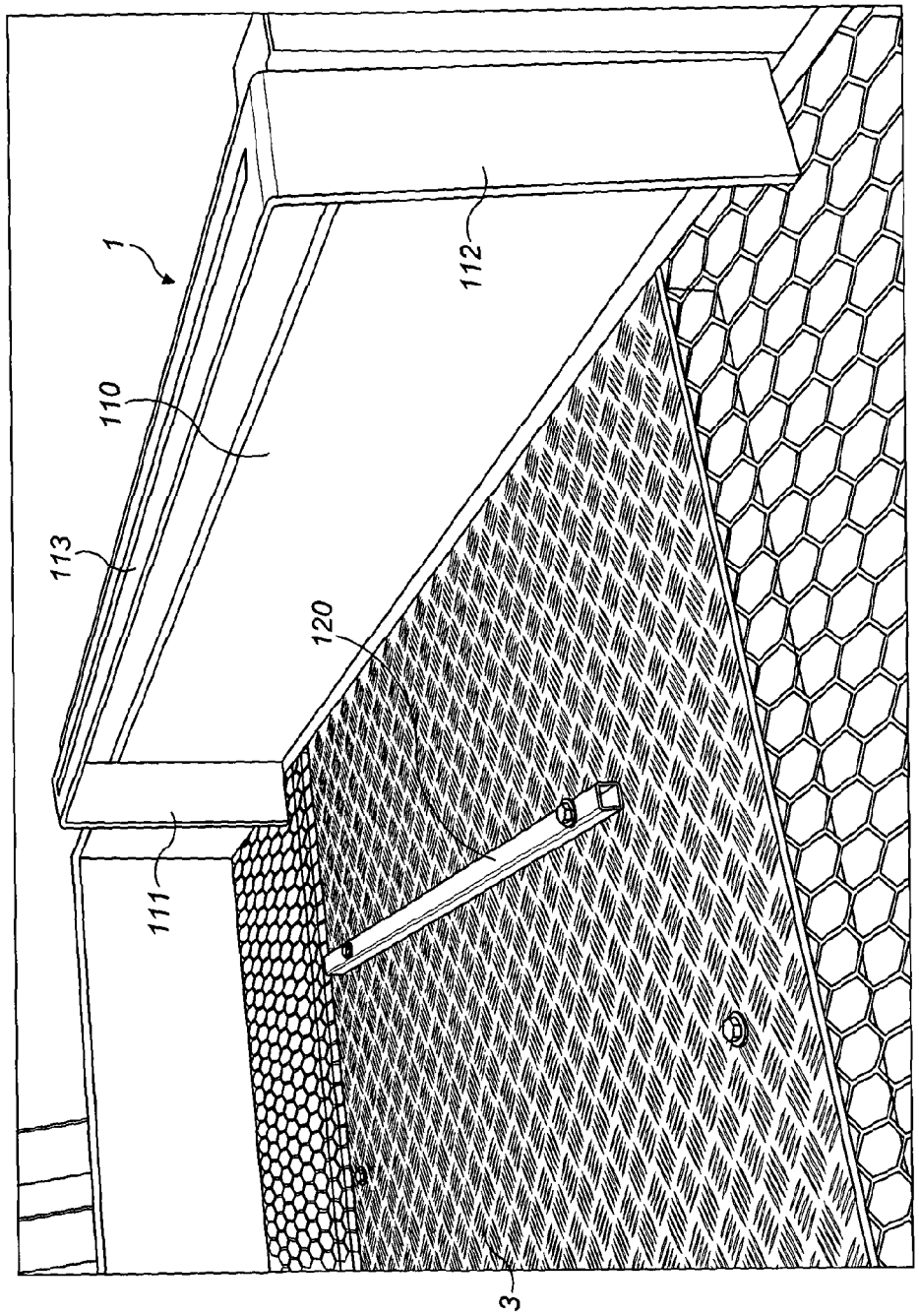
FIG. 2 shows side perspective view of a trailer including a mount according to an example embodiment of the present invention.
Figure 3:
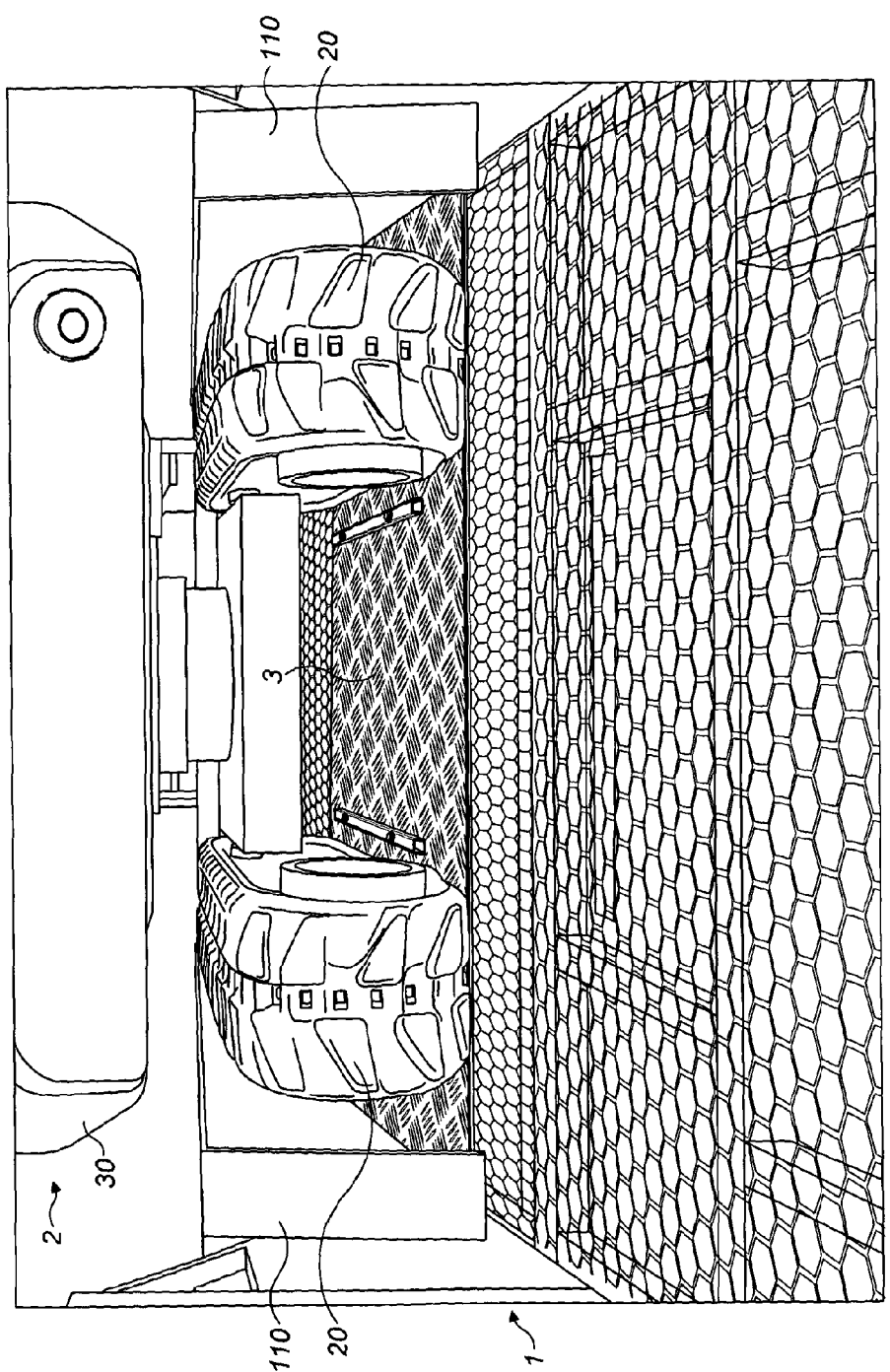
FIGS. 3 and 4 shows an end view of the trailer of FIG. 2 in use with a piece of plant machinery.
Figure 4:
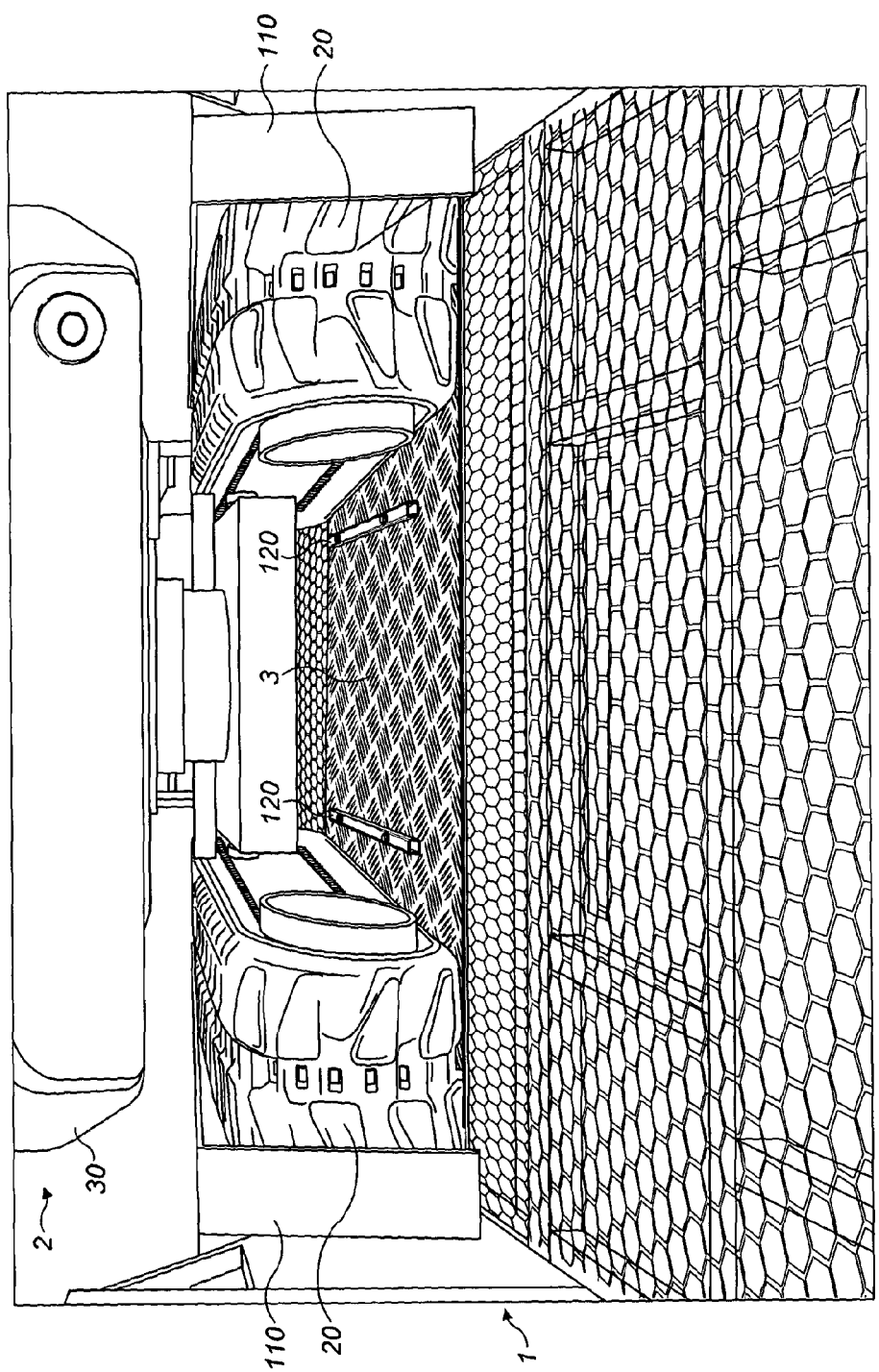

Referring now to FIGS. 1 and 2 there is shown a trailer 1 comprising a mount 100 suitable for use in attaching a piece of plant machinery thereto. The mount 100 is useful in an attachment method for attaching a piece of plant machinery to the mount. FIGS. 3 and 4 show the mount in use with a piece of plant machinery in the form of a mini-excavator 2.

To use the mount 100 a piece of plant machinery 2 comprising a body 30 and a moveable portion arrangeable relative to the body 30 is moved so that the body 30 is brought into a mounting location. The moveable portion is then arranged in cooperative engagement with the mount to attach the piece of plant machinery to the mount 100. Cooperative engagement, in the example embodiments described below involves butting up to, or lying in close adjacent proximity thereto. As will be described below, the piece of plant machinery 2 may comprise various movable portions, for example driving portions, a scraping blade or an arm. Moving a movable portion of the piece of plant machinery 2 into engagement with the mount 100 may conveniently provide a strong reliable attachment, without the need for additional moveable or removable mounting components.

A first embodiment of mount 100 useful in attaching the piece of plant machinery 2 to a trailer 1 involves the mount 100 cooperating with drive portions 20 of the piece of plant machinery 2, and will now be described in more detail. The piece of plant machinery 2, in this case the mini-excavator is driven under its own power onto the trailer 1, for example using a ramp or platform (not shown). The piece of plant machinery 2 moves on drive portions 20 comprising an arrangement of tracks. The drive portions 20 comprise tracks that contact the surface 3 on which the piece of plant machinery 2 rests, and by which the piece of plant machinery 2 may be moved. The body 30 of the piece of plant machinery 2 is driven into a mounting location relative to the mount 100, bringing the drive portions 20 into position relative to the mount 100, here alongside the mount 100. Movement of the body 30 is then stopped.

The mount 100 comprises a cowling 110 to receive the moveable portion. The cowling 110 is arranged above the surface 3 on which the body of the piece of plant machinery 2 rests. The cowling 110 is arranged to receive at least a part of the drive portion 20 of the piece of plant machinery 2 when the piece of plant machinery 2 is attached to the mount 100.

In the embodiment of FIGS. 1 to 4, the moveable portion comprises the drive portions 20, and arranging the moveable portion in cooperative engagement with the mount 100 comprises moving the drive portions 20 into a position in which at least a part of thereof is under the cowling 110. As shown in FIG. 3, the drive portions 20 are relatively closer to one another, enabling the piece of plant machinery 2 to move to the mounting location. The drive portions 20 are thereafter expandable away from one another into the mount 100 to cooperatively engage the mount as shown in FIG. 4. Typically, some mini-excavators are provided with expandably separable drive portions 20 to enable them to be manoeuvred through small gaps when moving, but still provide a stable platform when digging.

As can be seen in FIGS. 1 to 4, the cowling 110 is provided as a pair of opposed cowlings 110, each to receive a moveable portion and each comprising a first portion 111, second portion 112 and third portion 113. Arranging the moveable portion in cooperative engagement with the mount 100 comprises arranging a front part of the drive portion 2 alongside the first portion 111 of the cowling 110. Arranging the moveable portion in cooperative engagement with the mount 100 comprises arranging a rear part of the drive portion 20 alongside the second portion 112 of the cowling. Arranging the moveable portion in cooperative engagement with the mount 100 comprises arranging an upper part of the drive portion 20 alongside the third portion 113 of the cowling 110.

The mount 100 comprises a static component with no moving parts. This simplifies construction thereof, and enables the mount 100 to be securely fixed to the trailer 1 without fear of lost components.

FIGS. 1 to 4 further show guide rails 120, useful in aligning the drive portions 20 parallel to the mount 100 and also in positioning the drive portions on the surface 3 on which the piece of plant machinery 2 rests so as to be moveable between the cowlings 110. To move the piece of plant machinery 2 from the trailer 1, the drive portions are moved toward one another, causing them to slide across the surface 3 on which the piece of plant machinery 2 rests. The guide rails 120 serve to centralise the piece of plant machinery 2, meaning that even if there is a tendency for one of the drive portions 20 to initially remain underneath one of the cowlings 110 as the drive portions 20 approach one another, one of the guide rails 120 arrests movement of the corresponding drive portion once 20 out from underneath its cowling 110, causing the other drive portion 20 to move out from its cowling 110 and toward its guide rail 120.

Figure 5:
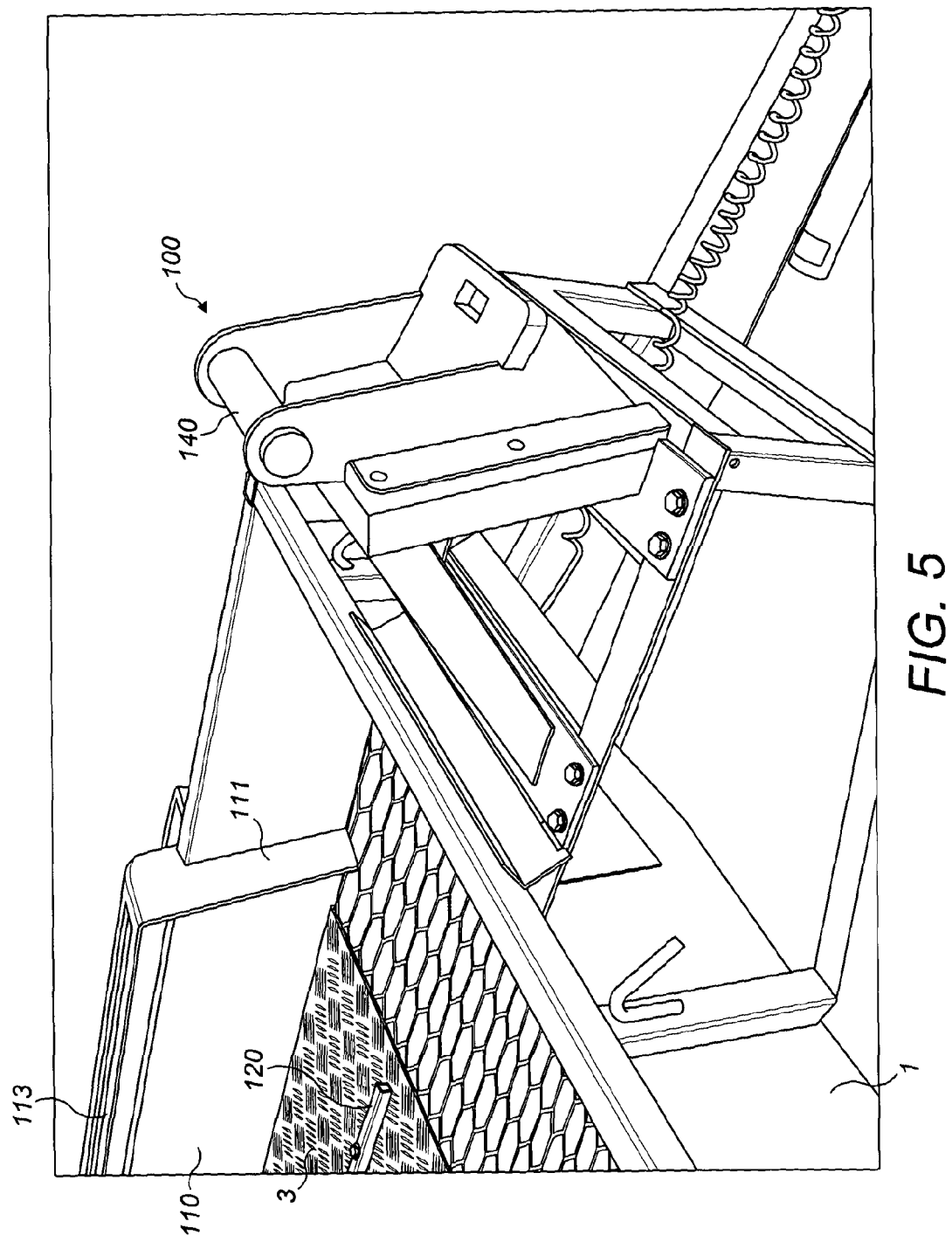
FIG. 5 shows a side perspective view of a trailer including a mount according to a further example embodiment of the present invention.
Figure 6:
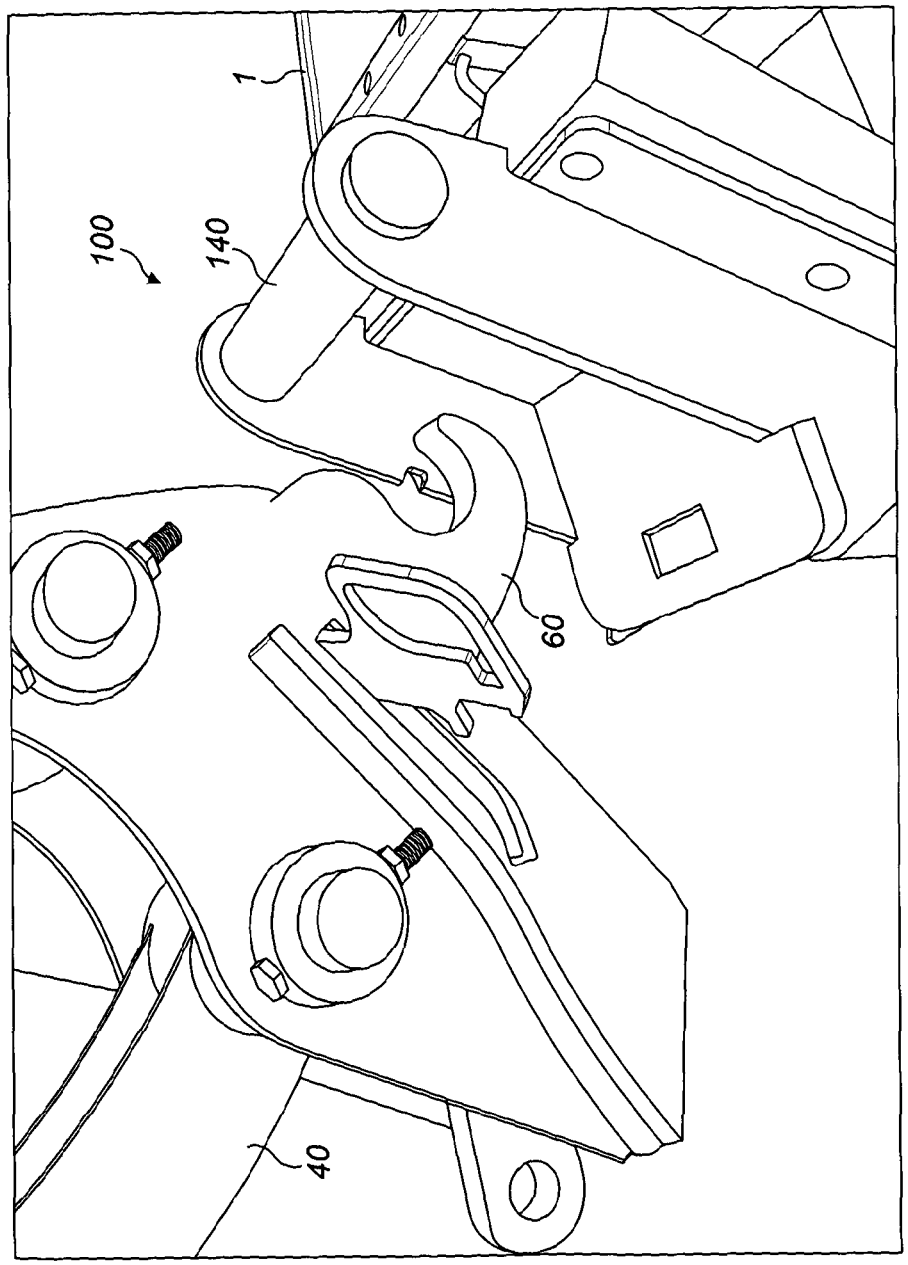
FIG. 6 shows a side perspective view of the trailer of FIG. 5 in use with a piece of plant machinery.

In another embodiment, as shown in FIGS. 5 and 6, the moveable portion comprises an arm 40 of the piece of plant machinery 2. Typically, the arm 40 comprises a hydraulically actuated arm, suitable for in use carrying a tool such as a bucket or breaker at the end thereof. The arm comprises a tool coupling 60 arranged toward the end of the arm 40, and arranging the moveable portion comprises positioning the tool coupling 60 to be coupled to the mount 100. The tool coupling 60 suitably comprises a quick release coupling arrangeable to releasably connect to a bar 140 provided on the mount 100.

Figure 7:
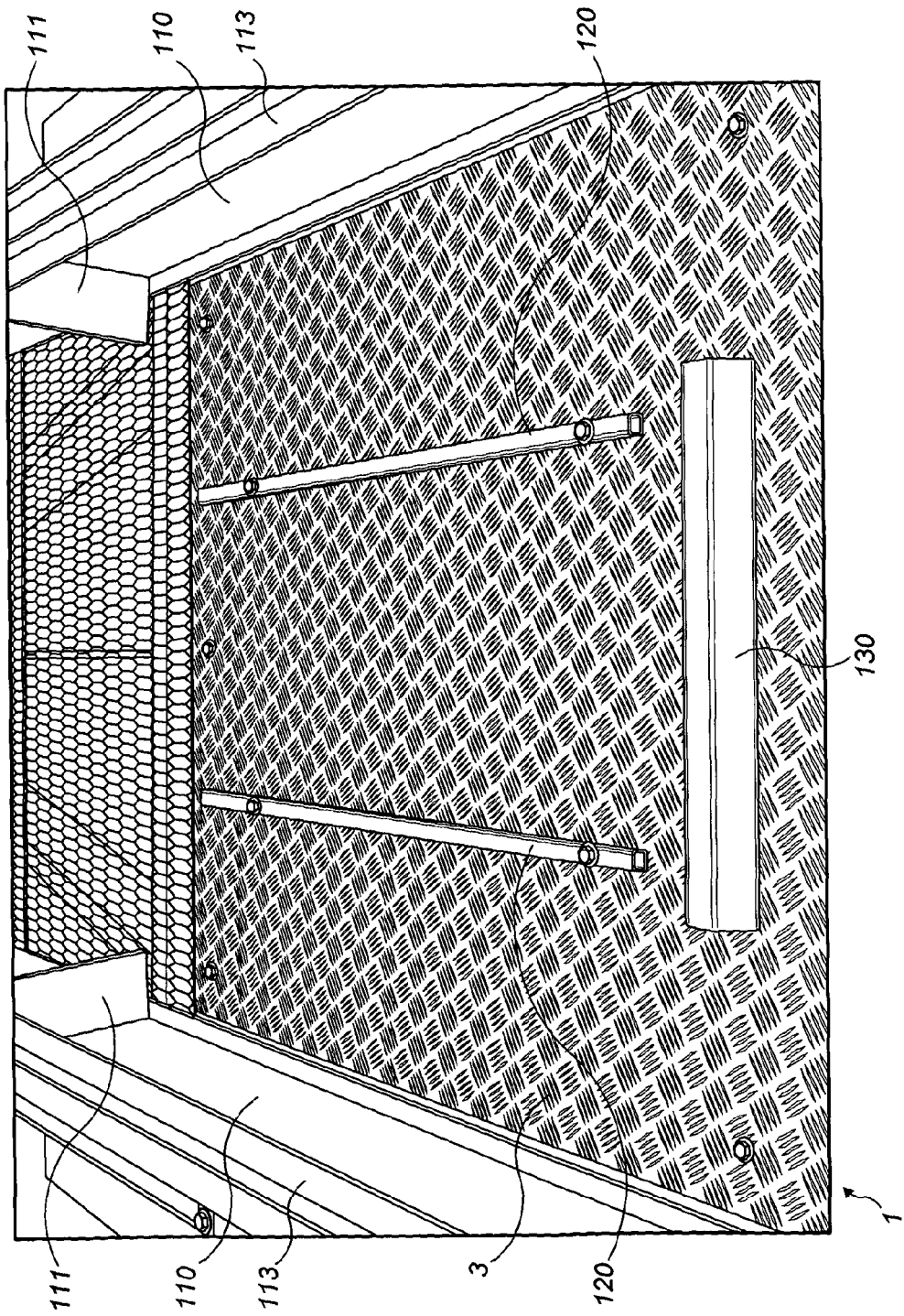
FIG. 7 shows an end perspective view of a trailer including a mount according to a still further embodiment of the present invention.

In another embodiment, as shown in FIG. 7, the moveable portion comprises a scraping blade (not shown) of the piece of plant machinery 2. Arranging the moveable portion comprises lowering the scraping blade into cooperative engagement with the mount 100, the mount comprising a stop 130 against which the lowered scraping blade can rest. The stop extends 130 from the surface 3 on which the piece of plant machinery rests. Moving the body of the piece of plant machinery relative to the mount 100 to bring the piece of plant machinery to a mounting location comprises moving the body such that the scraping blade passes over the mount 100. This body movement relative to the mount 100 takes place in a first direction, and the stop 130 is arranged when in cooperative engagement with the scraping blade to resist movement of the scraping blade in a second direction that is parallel to, but opposite in sense to the first direction. As can be seen in FIG. 7, the stop 130 extends in a direction perpendicular to the direction of the drive portions 2, i.e. the stop 130 extends in a direction which is typically parallel to a scraping edge of the scraping blade. In another embodiment which is not shown, the stop 130 is arranged when in cooperative engagement with the scraping blade to resist movement of the scraping blade in first and second directions, for example by comprising a slot into which the lower parts of the scraping blade may locate.

In other embodiments (not shown) a further attachment method for attaching a piece of plant machinery to mount using a drive portion of the piece of plant machinery is provided. For example, the expandable drive portions described above are not available on all mini-excavators or other pieces of plant machinery. However, the use of cowlings to engage drive portions is still useful. For example, a drive portion in contact with the surface on which the piece of plant machinery rests and comprising an arrangement by which the piece of plant machinery may be moved can be brought at least partially under the mount as the plant machinery moves across the surface on the drive portion, so that part of the drive portion comes into cooperative engagement with the mount to attach the piece of plant machinery thereto. The mount may provide a moveable gate portion or the like, which is arranged to allow the movement of the piece of plant machinery into the mount, and then moveable to a locking position in which the piece of plant machinery is prevented from moving back out of the mount. If the mount is provided as cowlings as described above in relation to FIGS. 1 to 4, the movable gate portion may be provided as the second portion 112 of the cowling. Alternatively, a stop such as described in relation to the embodiment of FIG. 7, or moveable ramp portion associated with the cowling may be used to prevent the piece of plant machinery from moving back out from under said mount once the piece of plant machinery is arranged in the mounting location.

Figure 8:
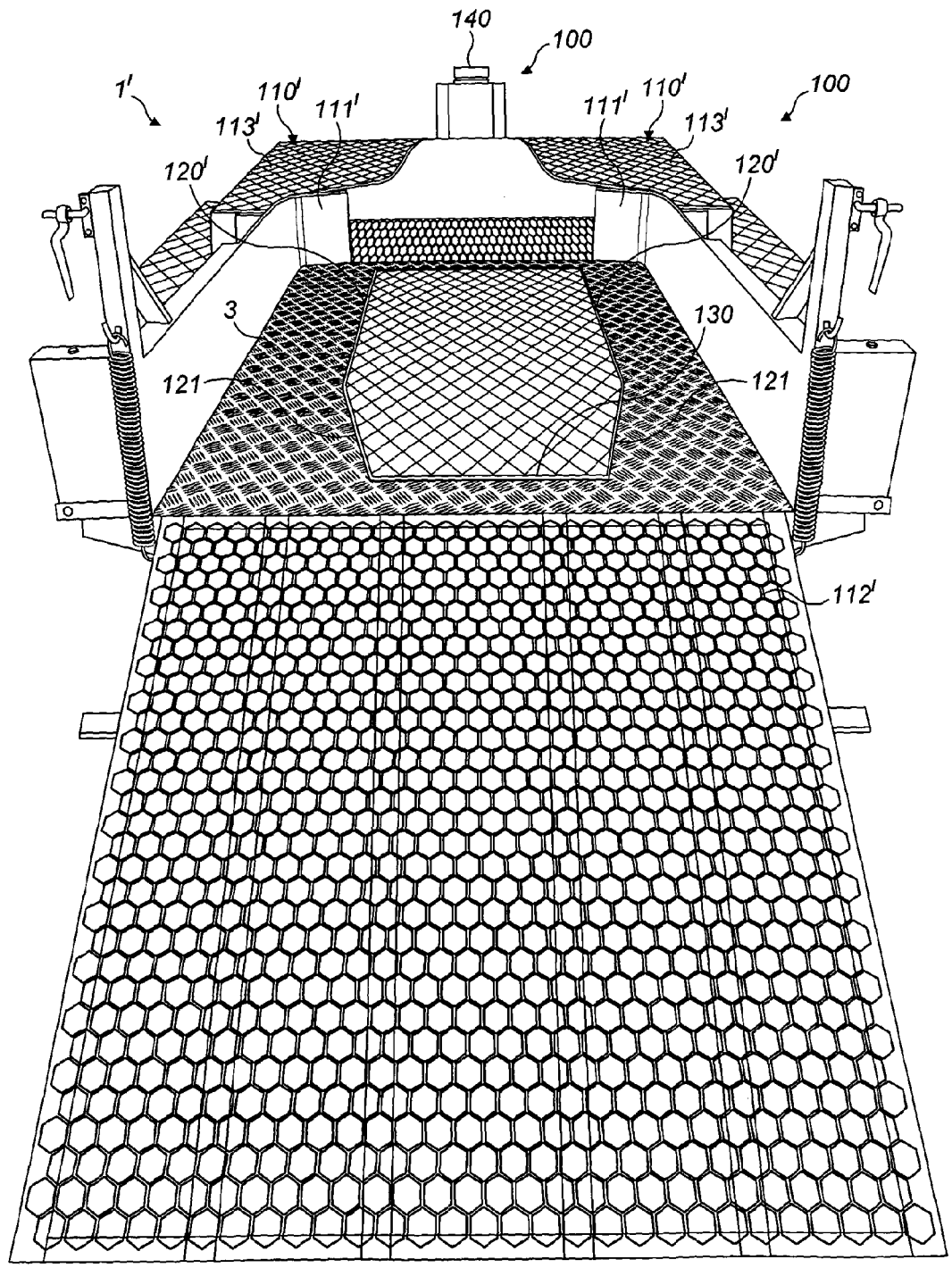
FIG. 8 shows an end view of a trailer including mounts according to a still further example embodiments of the present invention.
Figure 9:
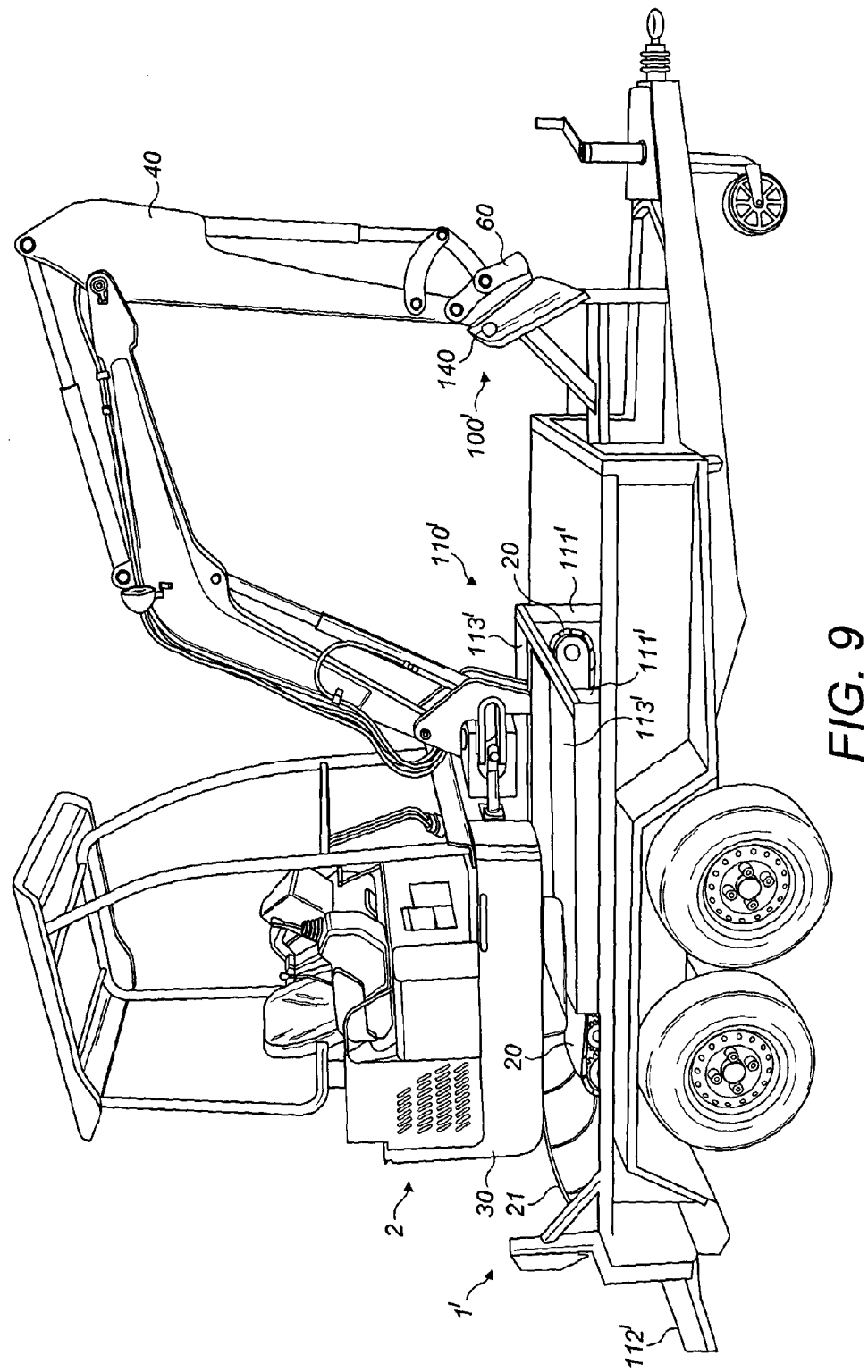
FIG. 9 shows a side perspective view of the trailer of FIG. 8 in use with a piece of plant machinery.

FIGS. 8 and 9 show an embodiment which combines features of the embodiments of FIGS. 1 to 7 and the embodiments described in the previous paragraph. That is, the trailer 1' comprises a mount 100 to cooperate with the arm 40 of a piece of plant machinery 2. The trailer 1' also comprises guide rails 120', useful in aligning the drive portions 20 and in positioning the drive portions on the surface 3 on which the piece of plant machinery 2 rests so as to be moveable between the cowlings 110'. The guide rails 120' are arranged to have an introducing portion 121 that presents a wider opening to the drive portions 20 to facilitate alignment of the drive portions 20 on the trailer 1', but which spread relative to one another in the direction of loading of the trailer 1' to then bring the drive portions 20 into place relative to the cowlings 110' with further movement in the loading direction. The piece of plant machinery 2 shown in FIG. 9 comprises a scraping blade 21. A stop 130 against which the lowered scraping blade can rest is provided as part of the mount 100 on the trailer 1'. The stop extends 130 from the surface 3 on which the piece of plant machinery 2 rests. Moving the body of the piece of plant machinery relative to the mount 100 to bring the piece of plant machinery to a mounting location comprises moving the body in a loading direction of the trailer, described above as a first direction, such that the scraping blade is positioned in cooperative engagement with the stop 130 to resist movement of the scraping blade in the loading direction. This distributes load which would otherwise be imparted onto the cowlings 110' by the piece of plant machinery 2, for example during deceleration of the trailer 1'.

Even though the expandable drive portions 20 described above are available on the piece of plant machinery 2, the cowlings 110' are arranged with only first and third portions, such that the drive portions of a fixed separation can be moved under the cowlings by moving into place on loading of the trailer 1'. The mount provides a moveable gate portion that allows movement of the piece of plant machinery onto the trailer 1' and into the mount. In this embodiment the piece of plant machinery 2 is prevented from moving back out of the mount as the movable gate portion provides, when closed, a second portion 112' of the cowlings.

The mounts and related methods and equipment described herein provide a simple and effective way of securing a piece of plant equipment. Although the plant equipment described in relation to the example embodiments is a mini-excavator, it will be apparent that other pieces plant equipment useful in industrial processes, such as excavators, bulldozers, backhoe loaders and the like can also benefit from operation with the mount.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A mount for attaching a piece of plant machinery thereto, the piece of plant machinery comprising a body and a moveable portion arrangeable relative to the body, the moveable portion comprising a moveable drive portion of the piece of plant machinery in contact, in use, with a surface on which the piece of plant machinery rests and by which the piece of plant machinery may be moved, the mount being arranged such that with the body of the piece of plant machinery moved under its own power to a mounting location, movement of the moveable portion brings the moveable drive portion under the mount and thus into cooperative engagement with the mount to attach the piece of plant machinery thereto, the mount comprising a cowling to receive the moveable portion.

2. The mount of claim 1, wherein the cowling is arranged above a surface on which the body of the piece of plant machinery rests to receive at least a part of the moveable portion there-under when the moveable portion is arranged in cooperative engagement with the mount.

3. The mount of claim 1, wherein the cowling is arranged to receive at least a part of a drive portion comprising an arrangement of wheels or tracks of the piece of moveable plant machinery when the moveable portion is arranged in cooperative engagement with the mount.

4. The mount of claim 3, wherein the cowling comprises one or more of: (i) a first portion, and the arranging the moveable portion in cooperative engagement with the mount comprises arranging a front part of the drive portion alongside the first portion of the cowling; (ii) a second portion, and the arranging the moveable portion in cooperative engagement with the mount comprises arranging a rear part of the drive portion alongside the second portion; and (iii) a third portion, and the arranging the moveable portion in cooperative engagement with the mount comprises arranging an upper part of the drive portion alongside the third portion.

5. The mount of claim 4, wherein the cowling comprises at least one portion that is arrangeable to cooperate with the piece of plant machinery to contribute to attaching the piece of plant machinery to the mount.

6. The mount of claim 1, comprising a first cowling arranged to receive a drive portion on a first side of the piece of plant machinery and a second cowling arranged to receive a drive portion on a second side of the piece of plant machinery.

7. A transporter comprising the mount of claim 1.

8. The mount of claim 1, further comprising:
at least one guide rail extending upward from the surface on which the piece of plant machinery rests to bring the moveable drive portion into alignment with the mount.

9. The mount of claim 8, wherein the at least one guide rail includes a first portion to position the moveable drive portion on the surface and a second portion to bring the moveable drive portion into alignment with the mount.

10. The mount of claim 8, further comprising:
a stop extending upward from the surface on which the piece of plant machinery rests, the stop being arranged substantially perpendicular to the at least one guide rail to engage a portion of the piece of plant machinery.

11. The mount of claim 1, wherein the cowling includes a portion positioned, in the mounting location, to reside directly above an upper part of the drive portion of the piece of plant machinery.

12. The mount of claim 1, wherein lateral movement of the moveable portion brings the moveable drive portion under the mount.

* * * * *